(12) United States Patent
Li

(10) Patent No.: US 6,429,611 B1
(45) Date of Patent: *Aug. 6, 2002

(54) ROTARY AND LINEAR MOTOR

(76) Inventor: Hui Li, 6216 Windsor Street, Vancouver, British Columbia (CA), V5W 3J3

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/493,223

(22) Filed: Jan. 28, 2000

(51) Int. Cl.[7] .................................................. H02K 41/00
(52) U.S. Cl. ............................ 318/115; 310/12; 310/20
(58) Field of Search ............................... 310/12, 20, 80; 318/115

(56) References Cited

U.S. PATENT DOCUMENTS

| 3,394,295 A | 7/1968 | Cory | 318/115 |
|---|---|---|---|
| 3,745,433 A | 7/1973 | Kelby, Jr. et al. | 318/115 |
| 4,281,263 A | 7/1981 | Virolleau et al. | 310/13 |
| 4,570,254 A | 2/1986 | Agostini | 310/156.32 X |
| 4,607,197 A | 8/1986 | Conrad | 318/115 |
| 4,687,961 A * | 8/1987 | Horber | 310/186 |
| 5,627,418 A | 5/1997 | Satomi et al. | 310/12 |
| 6,172,440 B1 * | 1/2001 | Sasaki et al. | 310/156.02 |
| 6,232,687 B1 * | 5/2001 | Hollenbeck et al. | 310/88 |

* cited by examiner

*Primary Examiner*—Burton S. Mullins
*Assistant Examiner*—Judson H. Jones
(74) *Attorney, Agent, or Firm*—Hall, Priddy, Myers and Vande Sande

(57) ABSTRACT

A rotary and linear motor having a rotor, a casing and a plurality of stator coils mounted to the interior of the casing spaced from the rotor and radially spaced apart around the rotor. A rotary and linear motor control circuit is operative to receive input data signals and to process these data signals so as to produce a plurality of pulse width modulated output control signals. A multi-phase inverter circuit is coupled to an output of the rotary and linear motor control circuit and is responsive to the plurality of output control signals to drive the stator coils and produce a desired z-axis displacement, z, and rotor angular displacement, $\theta$.

14 Claims, 4 Drawing Sheets

(a) No Displacement (b) Plus Displacement z (c) Minus Displacement z

ROTARY AND LINEAR MOTOR

FIELD

The present invention relates to a combination rotary and linear motor which uses a modified brushless DC motor.

BACKGROUND

There are a number of different configurations which provide a combination of rotary and linear motion. U.S. Pat. No. 4,570,254 issued to Agostini discloses a drive motor for a compact disc player which uses permanent magnets for both the rotor and the stator and employs magnetic attraction to move the rotor from an intermediate position to a playing position. The use of an axial magnetic attractive force results in a movement, which requires external stops to achieve a final position, as there is no control over the force itself.

There are a series of patents represented by U.S. Pat. No. 5,627,418 issued to Satomi et al. which employ a stepping motor having a stator and a mover having a series of laminated iron plates shaped to provide inner stator teeth along a direction of the motor axis and teeth in the circumferential direction and outer mover or rotor teeth opposed to said stator teeth. Permanent magnets are incorporated into the stator or rotor. Energizing the stator causes rotary motion and stepped linear motion. Aside from being complex to produce, such motors do not provide continuous precise motion control.

U.S. Pat. No. 3,394,295 issued to Cory discloses a pair of diametrically opposite coils which operate in conjunction with an axially spaced apart pair of diametrically opposite permanent magnets oriented at 90 degrees to the coils. The rotor has discrete energized positions which are 90 degrees with respect to each other and so also do not provide precise angular control.

Accordingly, it is an object of the invention to provide an improved motor providing concurrent rotary and linear motion. It is a further object of the invention to provide a motor with both concurrent rotary and linear motion and both of which are continuously precisely controllable.

SUMMARY OF THE INVENTION

According to the invention there is provided a rotary and linear motor having a rotor, a casing and a plurality of stator coils mounted to the interior of the casing spaced from the rotor and radially spaced apart around the rotor. A rotary and linear motor control circuit is operative to receive input data signals and to process these data signals so as to produce a plurality of pulse width modulated output control signals. A multi-phase inverter circuit is coupled to an output of the rotary and linear motor control circuit and is responsive to the plurality of output control signals to drive the stator coils and produce a desired z-axis displacement, z, and rotor angular displacement, θ.

The input data signals may include sensed linear displacement, z, sensed rotor angle, θ, coil current sensor outputs Ia, and Ib, and command axial displacement, $Z_c$, and command rotary angle, $θ_c$.

In another aspect of the invention there is provided a method of controlling the linear and rotary movement of a motor having a plurality of stator coils radially spaced around a rotor, wherein the rotor has at least one magnetic pole. The method includes transforming the coil currents through the stator coils into a current, Id, through a notional coil having a d-axis parallel to a pole of the rotor and a current, Iq, through a notional coil having a q-axis perpendicular to the d-axis. Next the method involves employing current Id to control the angular position of the rotor and employing current Iq to control the linear position of the rotor.

BRIEF DESCRIPTION OF THE DRAWINGS

Further features and advantages will be apparent from the following detailed description, given by way of example, of a preferred embodiment taken in conjunction with the accompanying drawings, wherein:

FIGS. 3a, 3b, and 3c are a set of three cross sections of the motor of FIG. 1 showing Z-axis movement;

DETAILED DESCRIPTION WITH REFERENCE TO THE DRAWINGS

Figure 1:
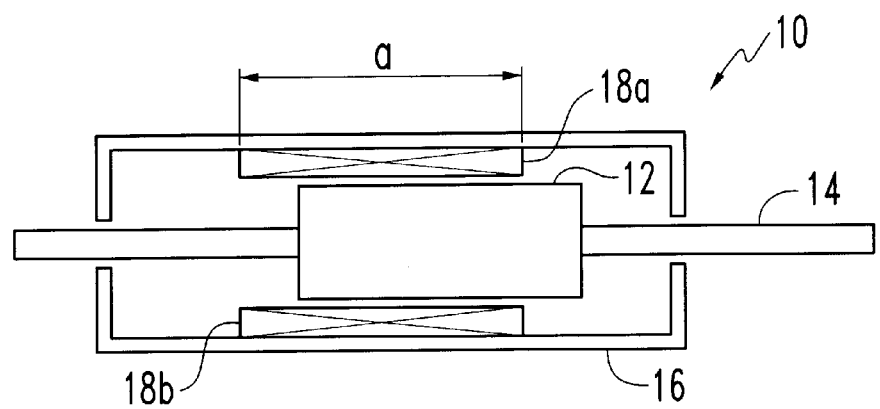
FIG. 1 is cross section taken transverse to the axis of the motor for a three phase one pole motor.
Figure 2:
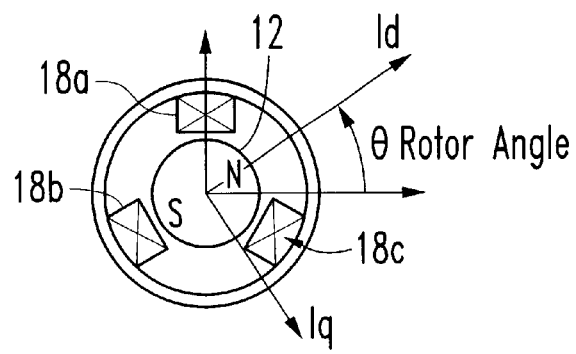
FIG. 2 is a cross section of the motor of FIG. 1 through the motor axis.

Referring to FIGS. 1 and 2, the rotary linear motor 10 has a rotor 12 mounted rigidly to a rotor shaft 14 journaled to a motor casing 16. Three radially equi-spaced coils 18a, 18b, and 18c are mounted to the interior cylindrical surface of the casing 16.

FIG. 2 shows the cylindrical rotor as being made of permanent magnet with a half-cylinder being the north pole and the other half cylinder being the south pole. A coordinate system, which moves with the rotation of rotor 12, has axes d and q with-the d-axis bisecting the north pole and directed outwardly from that pole and the q axis being perpendicular to the d-axis. Using this coordinate system one can define the following parameters:

Va=modulating signal voltage of signal modulating carrier signal for coil 18a,

Vb=modulating signal voltage of signal modulating carrier signal for coil 18b,

Vc=modulating signal voltage of signal modulating carrier signal for coil 18c,

Ia=current proportional to actual current through coil 18a,

Ib=current proportional to actual current through coil 18b,

Ic=current proportional to actual current through coil 18c,

Id=d-axis component of effective motor coil current,

Vd=d-axis component of effective motor coil voltage,

Iq=q-axis component of effective motor coil current,

Vq=q-axis component of effective motor coil voltage, a=coil length along direction of motor axis, z=rotor displacement along z-axis, θ=radial angle of displacement of rotor, ω=angular velocity of rotor (ω=dθ/dt), Ør=magnetic flux from the rotor, T=torque on rotor, F=force on rotor along Z-axis, R=resistance of stator coils, Ld=inductance due to the time variation of current along the d-axis, Lq=inductance due to time variation of current along the q-axis, c1=coefficient of back emf, c2=coefficient of torque.

It should be noted that Id is the current through a notional coil whose axis is aligned along the d-axis and Iq is the current through a notional coil whose axis is aligned along the q-axis.

The motor of FIGS. 1 and 2 is a three phase structure but the stator can be wound as a 4 or 5 phase structure. Similarly although a one pole rotor is shown, a two, or four pole rotor could be used.

The rotor length is not strictly required to be the same length as stator lenth, a. It may be slightly longer or shorter.

Equations for voltage, torque and z-axis force can be approximated as follows:

$$Vd = RId + Ld\ dId/dt + \omega Lq Iq + c1\ \emptyset r\ dz/dt,$$

$$Vq = RIq + Lq\ dIq/dt - \omega Ld\ Id + \emptyset r\ \omega,$$

$$T = c2\ \emptyset r\ Iq,\ \text{and}\ F = f(z, Id),$$

$$Va = Vd\ \cos(\theta) + Vq\ \sin(\theta),$$

$$Vb = Vd\ \cos(\theta - 2\pi/3) + Vq\ \sin(\theta - 2\pi/3),$$

$$Vc = Vd\ \cos(\theta - 4\pi/3) + Vq\ \sin(\theta - 4\pi/3),$$

$$Ic = -(Ia + Ib),$$

$$Id = (Ia\ \cos(\theta) + Ib\ \cos(\theta - 2\pi/3) + Ic\ \cos(\theta - 4\pi/3)) * 0.66,$$

$$Iq = (Ia\ \sin(\theta) + Ib\ \sin(\theta - 2\pi/3) + Ic\ \sin(\theta - 4\pi/3)) * 0.66.$$

Figure 3A:
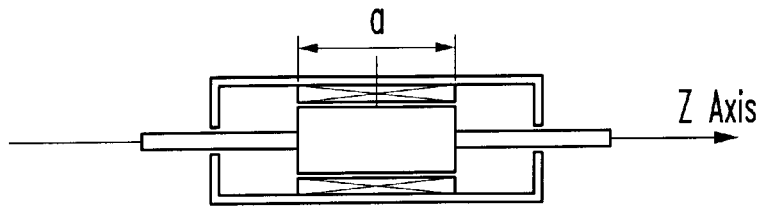
Figure 3B:
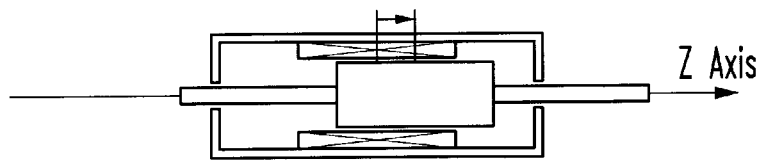
Figure 3B:
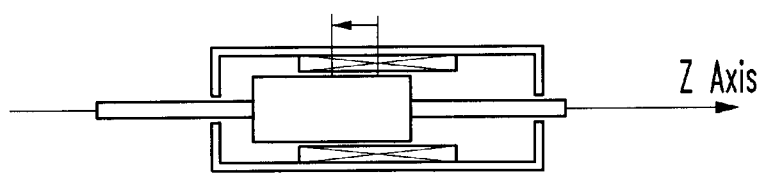

Considering that F is a function only of the position along the z-axis and the current Id, when there is d-axis current, Id, and a displacement of the rotor along the z axis as seen in FIGS. 3b, and 3c, then there will be a net force F which tends to pull the rotor in or push it out of alignment with the coils along the z-axis of the motor.

Figure 4:
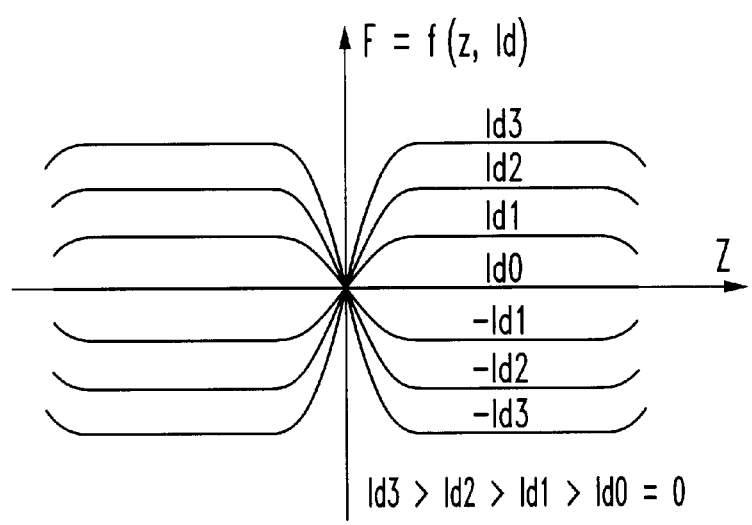
FIG. 4 is a graph showing the force along the z-axis for various values of the d-axis component of motor coil current.

Referring to FIG. 4, the relationship of force F and f(z,Id) for various values of Id is shown. It will be seen that the force F is zero at z=0 but rises steeply to a flat portion which, at large positive and negative values of z, falls off towards zero. Consequently, operation on the flat portion of the curves is preferred.

A q-axis current will create a torque on the rotor so as to cause the rotor to turn. The z-axis force due to Iq is almost nil. Because of the minimum of interaction by Iq on the z-axis force and Id on the rotor torque, Id can be used to control z-axis movement and Iq can be used to make the motor turn.

Figure 5:
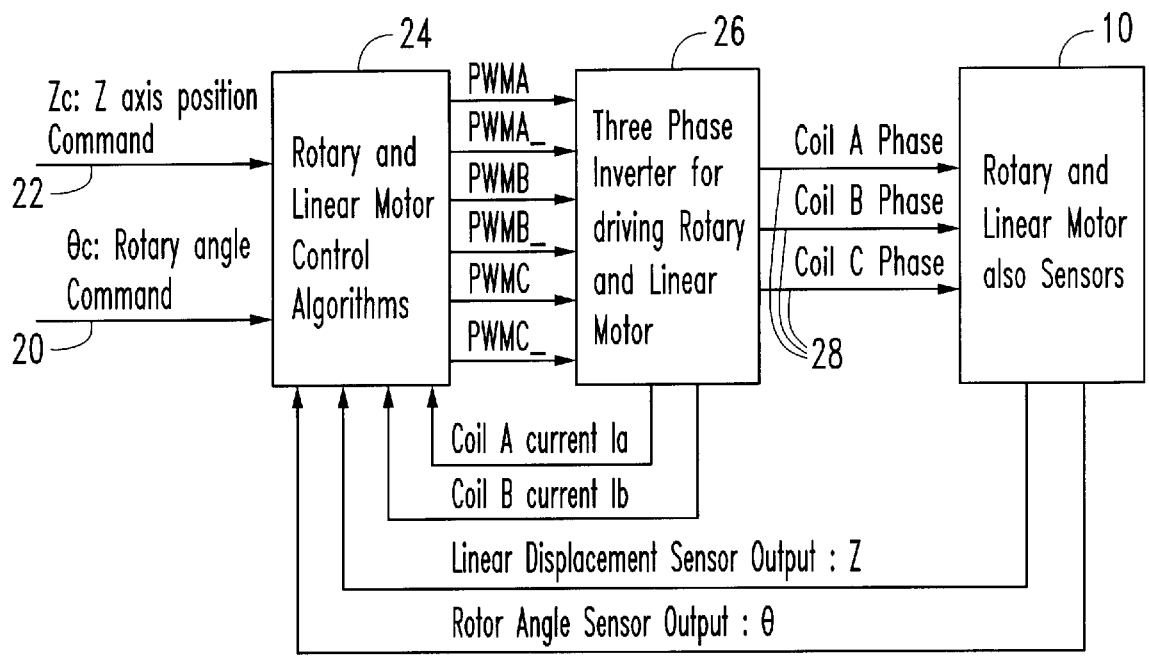
FIG. 5 is a schematic diagram of the motor control circuit.
Figure 6:
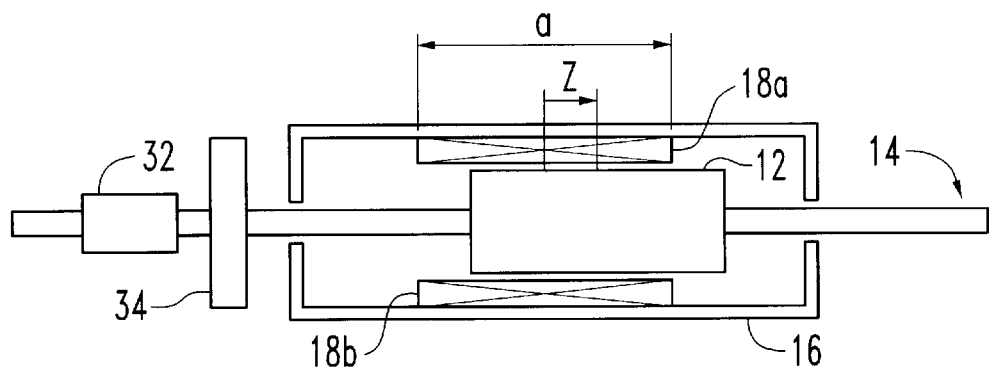
FIG. 6 is a cross section of the motor along a plane through its shaft with the linear displacement and rotor angle sensor.

Referring to FIG. 5, the required z-axis position is input as a command on line 22 while the required rotary angle θ is input on line 20. The rotary and linear motor control algorithms are output on any of 6 outputs, namely, PWMA, PWMA_, PWMB, PWMB_, PWMC, and PWMC_. Here the acronym PWM stands for pulse width modulation. Each of the signals PWMA, PWMA_, PWMB, PWMB_, PWMC, and PWMC_ drive a three phase inverter 26 for driving the rotary and linear motor 10. The output from the three phase inverter 26 on the three lines 28 drives coil A, coil B and coil C, respectively. The coil current in coils A and B are each sensed and fed back to the motor control algorithms 24. As seen in FIG. 6, axial displacement and rotor angle are each sensed in the motor 10 by a linear displacement sensor 32 and rotor angle sensor 34 and fed back to motor control algorithms 24 (see FIG. 5).

Figure 7:
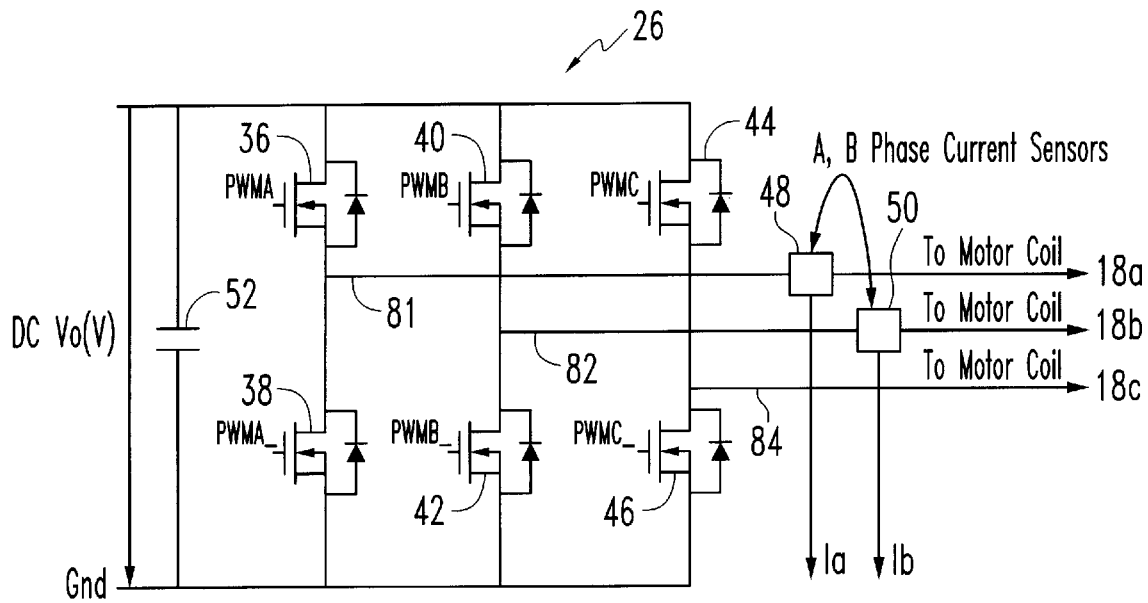
FIG. 7 is a circuit diagram for a three phase inverter used for driving the motor.

Referring to FIG. 7 there is shown the three phase inverter for driving the rotary and linear motor. In this case series connected field effect transistors (FETs) 36 and 38, 40 and 42, and 44 and 46 are coupled together in series across an input capacitor 52. Outputs are taken from the intersection of the pairs of FETS. If, for example, the FET 38 driven by PWMA_ goes ON, then the line to motor coil A is drawn down to ground potential. If, however, the FET 36 driven by PWMA goes ON, the line to motor coil A is raised to Vo.

Figure 8:
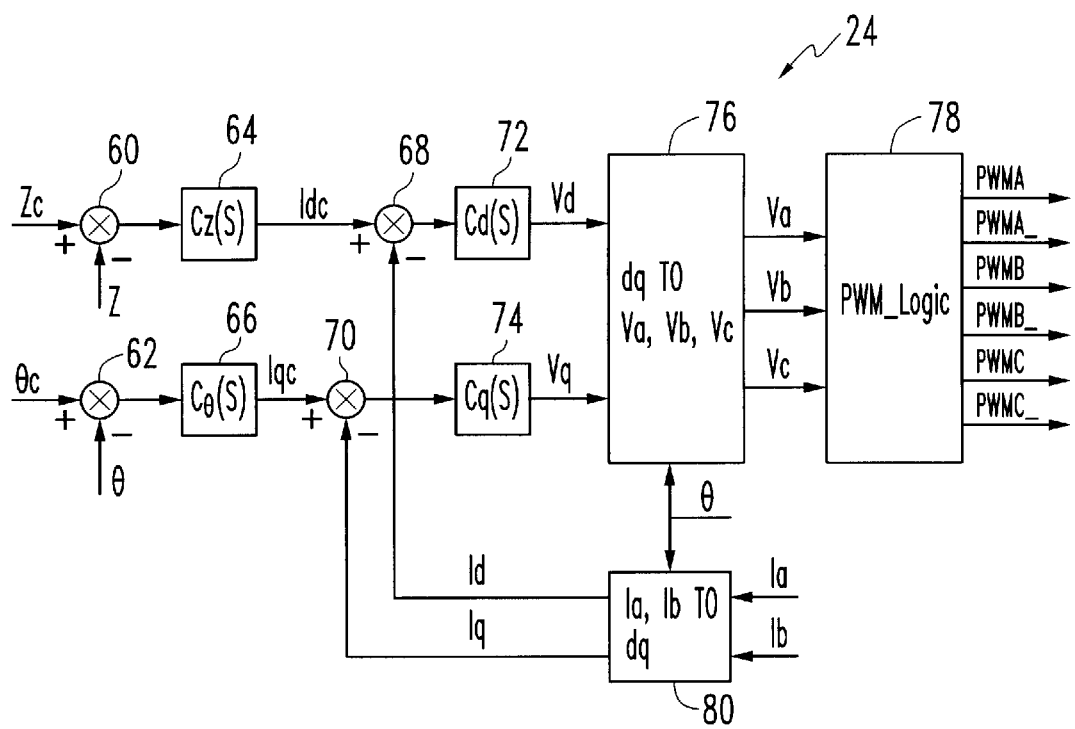
FIG. 8 is schematic diagram of the control algorithm for the motor.

The motor control algorithms, shown in detail in FIG. 8, have comparators 60 and 62. Comparator 60 subtracts the measured value of "z" from the command value $z_c$ and sends the difference to Cz(S) 64. Similarly, comparator 62 subtracts the measured rotor angle θ from the command value $\theta_c$ and the difference is sent to $C_{74}$ (S) 66. The output from Cz(S) 64 is the z-axis force Idc while that from $C_\theta$(S) 66 is current Iqc. Generally, Cz(S) 64 and $C_{74}$ (S) 66 take the form of a PID Controller, where S is the Laplace Operator. Another set of comparators 68 and 70 subtract Id from the command value Idc and Iq from Iqc and sends the differences to Cd(S) 72 and Cq(S) 74, respectively. Generally, Cd(S) 72 and Cq(S) 74 take the form of a PI Controller, where S is the Laplace Operator. The values of Id and Iq are determined by transformation block 80 from Ia and Ib, the coil current in coils Ia and Ib in accordance with the following formulas:

$$Id = (Ia\ \cos(\theta) + Ib\ \cos(\theta - 2\pi/3) + Ic\ \cos(\theta - 4\pi/3)) * 0.66$$

$$Iq = (Ia\ \sin(\theta) + Ib\ \sin((\theta - 2\pi/3) + Ic\ \sin(\theta - 4\pi/3)) * 0.66$$

Here Ic=−(Ia+Ib). The value of θ is obtained from the rotor angle sensor 34 (see FIG. 6) and fed to transformation blocks 76 and 80. The output from Cd(S) 72 is Vd while that from Cq(S) is Vq. Vd and Vq are directed to a transformation block 76 which calculates the phase voltages Va, Vb, and Vc which are calculated according to the following formulae:

$$Va = Vd\ \cos(\theta) + Vq\ \sin(\theta)$$

$$Vb = Vd\ \cos(\theta - 2\pi/3) + Vq\ \sin(\theta - 2\pi/3)$$

$$Vc = Vd\ \cos(\theta - 4\pi/3) + Vq\ \sin(\theta - 4\pi/3)$$

Figure 9:
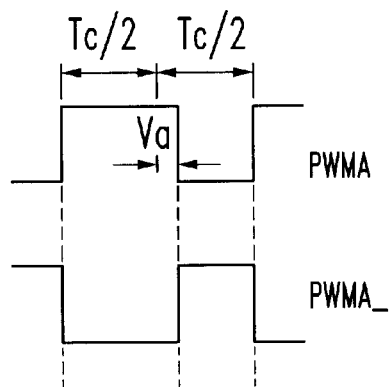
FIG. 9 is a waveform diagram showing the effect of coil voltages on the pulse width modulated signals to the coils.

Thus, Va, Vb, and Vc have a sinusoidal waveform. The PMW logic circuit 78 (see FIG. 8) uses Va, Vb, and Vc to establish PWMA, PWMA_, PWMB, PWMB_, PWMC, and PWMC_. Referring to FIG. 9, Va causes the logic circuit 78 to extend the time duration of the first half cycle by an amount proportional to the value of Va and decreases the time duration of second half cycle by a like amount. The signals PWMA_, PWMB, PWMB_, PWMC, and PWMC_ are determined in similar way.

In operation, as seen in FIG. 5 and 8, command values of the z-axis position "$Z_c$" and the rotary angle "$\theta_c$" are generated by a software program (not shown) programmed to carry out a sequence of operations. At the same time actual values of "z" and "θ" sensed by the linear displacement sensor 32 and the rotor angle sensor 34 are sent from the rotary and linear motor and sensors 10 to the rotary and linear motor control algorithm 24. As discussed above, the values of "z" and "$Z_c$" and "θ" and "$\theta_c$" are compared and the difference fed into Cz(S) 64 and C$_\theta$(S) 66 to yield Idc and Iqc, respectively. Coil currents Ia and Ib are transformed by transformation block 80 to produce Id and Iq. Idc and Iqc are compared with Id and Iq by comparators 68 and 70, respectively, and the differences sent to Cd(S) 72 and Cq(S) 74 to yield Vd and Vq, respectively. Transformation block 76 transforms Vd and Vq to produce coil voltages Va, Vb, and Vc, on three separate lines, which are applied to the PWM Logic circuit 78. The outputs from the PWM Logic circuit 78 are applied to respective gates of FETs 36, 38, 40, 42, 44, and 46 (see FIG. 7). The outputs 81, 82, and 84 from the junction of the pairs of FETs 36 and 38, 40 and 42, and 44 and 46, respectively, are directed to the motor coils 18a, 18b, and 18c. Current sensors 48 and 50 for coils 18a and 18b are in output lines 81 and 82, respectively.

For a rotor having two or more poles and six or more stator coils the operation would follow the principle as for a single pole-three stator coil configuration except torque is increased with an increased number of poles and associated stator coils.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

I claim:

1. A rotary and linear motor having a rotor and a motor casing, said rotary and linear motor, comprising:
   (a) a rotor of permanent magnetic material having at least one north magnetic pole and one south magnetic pole, said north and said south magnetic poles being transverse to an axis of rotation of said rotor, said rotor mounted within said motor casing both for rotation and for movement along the axis of rotation of said rotor;
   (b) a plurality of multi-phase stator coils spaced around an interior surface of said motor casing, positioned to be cut by a magnetic field of said rotor as said rotor rotates; and
   (c) a rotary and linear motor control circuit coupled to said stator coils and operative to control the current through said stator coils so that a magnetic field of said stator coils produced by said current interacts with the magnetic field produced by the permanent magnet poles of said rotor to produce both a torque and a linear force on said rotor.

2. A rotary and linear motor according to claim 1, having a motor and rotor casing, said rotary and linear motor, comprising:
   (a) a rotor of permanent magnetic material having at least one north magnetic pole and one south magnetic pole, said north and said south magnetic poles being transverse to an axis of rotation of said rotor, said rotor mounted within said motor casing both for rotation and for movement along the axis of rotation of said rotor;
   (b) a plurality of multi-phase stator coils spaced around an interior surface of said motor casing, positioned to be cut by a magnetic field of said rotor as said rotor rotates; and
   (c) a rotary and linear motor control circuit coupled to said stator coils and operative to control the current through said stator coils so that a magnetic field of said stator coils produced by said current interacts with the magnetic field produced by the permanent magnet poles of said rotor to produce both a torque and a linear force on said rotor, wherein said rotary and linear motor control circuit transforms current through said stator coils into a current, Id, through a notional coil having a d-axis parallel to a pole of said rotor and a current, Iq, through a notional coil having a q-axis perpendicular to said d-axis.

3. A rotary and linear motor according to claim 2, wherein said rotary and linear motor control circuit is operative to receive input data signals and to process these data signals so as to produce a plurality of output control signals.

4. A rotary and linear motor according to claim 3, wherein said input data signals include sensed linear displacement, z, sensed rotor angle, $\theta$, coil current sensor outputs, Ia and Ib, command axial displacement, $Z_c$, and command rotary angle, $\theta_c$.

5. A rotary and linear motor according to claim 4, wherein said rotary and linear motor control circuit includes:
   a) a comparator operative to subtract a sensed value of z with a command value $Z_c$ and to input the result into a controller Cz(S) to produce a current Idc;
   b) a comparator operative to subtract a sensed value of $\theta$ with a command value $\theta_c$ and to input the result into a controller C$\theta$(S) to produce a current Iqc;
   c) an Id comparator coupled to an output of controller Cz(S) and to a source of Id and operative to produce a difference Idc-Id;
   d) an Iq comparator coupled to an output of controller C$\theta$(S) and a source of Iq and operative to produce a difference Iqc-Iq;
   e) a controller Cd(S) coupled to an output of said Id comparator operative to produce a voltage Vd;
   f) a controller Cq(S) coupled to an output of said Iq comparator and operative to produce a voltage Vq;
   g) a transformation block coupled to outputs of said controllers Cd(S) and Cq(S) operative to produce coil voltages Va, Vb and Vc; and
   h) a PWM logic circuit coupled to an output of said transformation block and operative to produce pulse width modulated output control signals PWMA, PWMA_, PWMB, PWMB_, PWMC and PWMC_.

6. A rotary and linear motor according to claim 5, wherein said transformation block computes Va, Vb and Vc from Vd and Vq in accordance with the following:

$Va = Vd \cos(\theta) + Vq \sin(\theta)$ $Vb = Vd \cos(\theta - 2\pi/3) + Vq \sin(\theta - 2\pi/3)$ $Vc = Vd \cos(\theta - 4\pi/3) + Vq \sin(\theta - 4\pi/3)$.

7. A rotary and linear motor according to claim 6, further comprising a multi-phase inverter circuit coupled to an output of said rotary and linear motor control circuit and responsive to said plurality of output control signals to drive said stator coils and produce a desired linear displacement of said rotor along an axis thereof, z, and angular displacement of said rotor, $\theta$.

8. A rotary and linear motor according to claim 7, wherein output signals from said multi-phase inverter are square waves each with a period of Tc, a width of whose first half cycle is adjusted in proportion to a corresponding one of said coil voltages Va, Vb and Vc and a width of whose second half cycle is adjusted to leave the period unchanged at Tc.

9. A rotary and linear motor according to claim 4, including a coil current transformation block coupled to said coil current sensor outputs, Ia and Ib, and operative to produce currents Id and Iq in accordance with the formulas:

$$Id = (Ia\ \text{Cos}(\theta) + Ib\ \text{Cos}(\theta - 2\pi/3) + Ic\ \text{Cos}(\theta - 4\pi/3)) * 0.66$$

$$Iq = (Ia\ \text{Sin}(\theta) + Ib\ \text{Sin}(\theta - 2\pi/3) + Ic\ \text{Sin}(\theta - 4\pi/3)) * 0.66$$

$$Ic = -(Ia + Ib)$$

where Id is a current along a d-axis which bisects the rotor along a direction which bisects a north pole of said rotor and projects outwardly therefrom and Iq is perpendicular to Id.

10. A rotary and linear motor according to claim 1, wherein said stator coils are identical and equidistantly spaced about an interior surface of said motor casing.

11. A rotary and linear motor according to claim 7, wherein said multi-phase inverter includes pairs of series connected FET's having junctions output on lines connected to said stator coils and each pair of FET's connected between a ground an a voltage source.

12. A motor according to claim 1, wherein said rotary and linear motor includes a linear rotor displacement sensor operative to measure a linear position of said rotor relative to said stator coils and a rotor angle sensor operative to measure an angular position of said rotor.

13. A linear and rotary motor according to claim 3, further comprising a multi-phase inverter circuit coupled to an output of said rotary and linear motor control circuit and responsive to said plurality of output control signals to drive said stator coils and produce a desired linear displacement of said rotor along an axis thereof, z, and angular displacement of said rotor, $\theta$.

14. A method of controlling linear and rotary movement of a motor having a plurality of stator coils radially spaced around a rotor, said rotor having at least one magnetic pole, comprising:

a) transforming the coil currents through said stator coils into a current, Id, through a notional coil having a d-axis parallel to a pole of said rotor and a current, Iq, through a notional coil having a q-axis perpendicular to said d-axis;

b) employing current Iq to control the angular position of said rotor; and c) employing current Id to control the linear position of said rotor.

* * * * *